June 29, 1965 W. E. TRAGERT ETAL 3,192,070
FUEL CELL
Filed Oct. 4, 1962 2 Sheets-Sheet 1
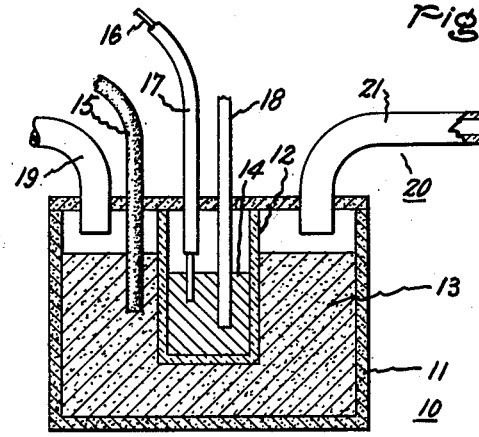
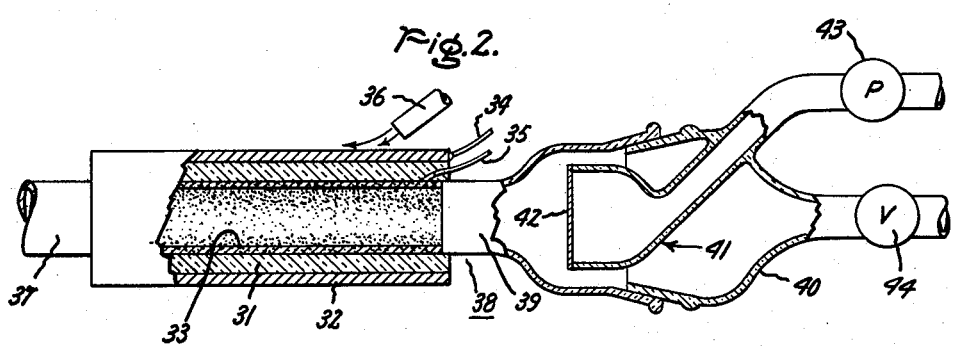
Inventors:
William E. Tragert,
Henry S. Spacil,
Robert L. Fullman,
by Paul R. Webb, II
Their Attorney.

June 29, 1965  W. E. TRAGERT ETAL  3,192,070
FUEL CELL
Filed Oct. 4, 1962  2 Sheets-Sheet 2

Inventors:
William E. Tragert,
Henry S. Spacil,
Robert L. Fullman,
by Paul R. Webb, II
Their Attorney.

United States Patent Office

3,192,070
Patented June 29, 1965

---

3,192,070
FUEL CELL
William E. Tragert, Scotia, and Henry S. Spacil and Robert L. Fullman, Schenectady, N.Y., assignors to General Electric Company, a corporation of New York
Filed Oct. 4, 1962, Ser. No. 228,390
6 Claims. (Cl. 136—86)

This invention relates to fuel cells and more particularly to fuel cells with a gas separator whereby the gaseous effluent stream is separated into component gases.

Fuel cells convert chemical energy of a fuel directly into electrical energy without the conversion of the energy of the fuel into heat and mechanical energy. Such fuel cells would be advantageous to provide a low voltage direct current power source on a continuous basis. These cells would have application in various chemical process industries, such as the manufacture of aluminum and the electro-refining of copper and in the operation of direct current motors.

In the operation of fuel cells employing a hydrogen containing fuel, the gaseous effluent stream may contain a significant quantity of unreacted fuel that could represent a serious efficiency loss. Thus, it would be desirable to separate such an effluent stream into component gases, some of which can be recycled in the fuel cell or used for other applications while other components are discarded as waste. Hydrogen is a gas which is frequently advantageous to recover from such a gaseous mixture. Thus, it would be desirable to provide a fuel cell with a gas separator.

It is an object of our invention to provide a fuel cell with a gas separator.

It is a further object of our invention to provide a fuel cell with a gas separator wherein hydrogen gas is separated from the cell effluent stream.

In carrying out our invention in one form, a fuel cell comprises a cathode, an electrical lead contacting the cathode, means to supply a gaseous oxidant to the cathode, an anode, an electrical lead contacting the anode, means to supply a hydrogen containing fuel to the anode, an electrolyte in contact with said cathode and said anode, a gas separator for the cell, the separator comprising a gas inlet portion. a first gas outlet portion in communication with the gas inlet portion, a second gas outlet portion in communication with the gas inlet portion, a member selected from the group consisting of iron and iron alloys positioned between the gas inlet portion and the second gas outlet portion, and means to maintain a hydrogen pressure differential on opposite sides of the member.

These and various other objects, features, and advantages of the invention will be better understood from the following description taken in connection with the accompanying drawing in which:

FIGURE 1 is a sectional view of a fuel cell with a gas separator embodying our invention;

FIGURE 2 is a sectional view of a modified fuel cell with a modified gas separator;

Figure 3:
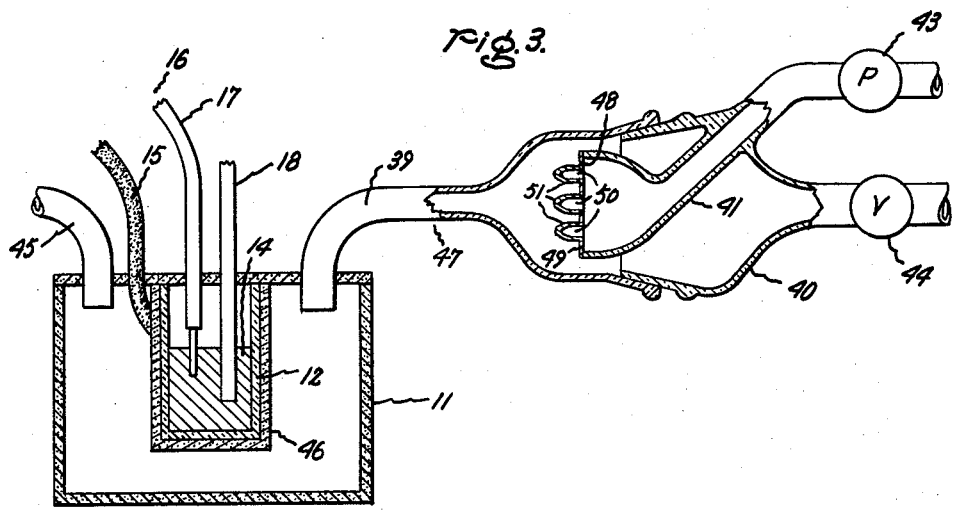
FIGURE 3 is a sectional view of another modified fuel cell with a further modified gas separator.

In FIGURE 1, a fuel cell which is adapted to operate in a temperature range of 1000° C. to 1200° C. is shown generally at 10. This cell comprises a container 11, for example, of alumina or carbon in which is positioned a second container 12 of stabilized zirconia, the cell electrolyte to form an anode chamber. For example, the stabilized zirconia consists of zirconia with 15 molecular percent calcium oxide. A porous carbonaceous electrode 13 of carbon powder is positioned in container 11 and is in direct contact with container 12. A silver electrode 14, which is molten during cell operation, is positioned within and in direct contact with second container 12 which forms a cathode chamber. A lead 15, such as of carbon, contacts electrode 13 by being inserted therein while a lead 16, such as of stainless steel, contacts electrode 14 in a similar manner. One end of lead 16 is inserted in the silver electrode and the other end is connected to apparatus (not shown) being operated by the cell. Lead 16 can be encased by insulation 17. The free end of lead 15 is connected in a similar manner to the same apparatus to complete the circuit from cell 10.

Means are provided for supplying a gaseous oxidant in the form of air or oxygen to silver electrode 14. For example, a tube 18 of zirconia, alumina or stainless steel is inserted into electrode 14 and connected to an oxidant supply (not shown). A hydrogen containing fuel, such as a hydrocarbon gas is supplied to carbonaceous electrode 13. For example, an inlet line 19 provides such a gas in the form of methane or propane to cell 10 wherein the gas is thermally decomposed to carbonaceous material which is supplied to carbonaceous electrode 13. Thus, electrode 13 and the additional carbonaceous material provide the fuel for the cell.

A gas separator 20, which is connected to the anode chamber, removes the gaseous effluent mixture from cell 10. Such a mixture might include hydrogen, carbon monoxide and carbon dioxide. Separator 20 includes a gas inlet portion 21 and a first gas outlet portion 22 which are joined together by a metallic member 23 thereby defining a continuous passage 24. A chamber 25 having a wall 26 surrounds member 23 and part of inlet portion 21 and first gas outlet 22 to define a second gas outlet portion.

Gas inlet portion 21, first gas outlet 22 and chamber wall 26 are composed of a non-permeable material, such as, a non-permeable metal, a ceramic or a permeable metal with a non-ferrous or ceramic coating to provide a non-permeable material. Member 23 is selected from the group consisting of iron and iron alloys to provide a hydrogen permeable member at elevated temperatures. An aperture 27 is located in wall 26 of chamber 25. A flange 28, which surrounds aperture 27, has a tube 29 connected thereto. The opposite end of tube 29 is connected to a pump 30 to evacuate chamber 25 whereby a hydrogen pressure differential is maintained on opposite sides of member 23 and hydrogen gas is removed. The hydrogen gas is stored in a suitable vessel (not shown).

We found that a fuel cell employing a hydrogen containing fuel could be constructed with a gas separator whereby the gaseous effluent stream is separated into component gases. Such a fuel cell comprises a cathode, an electrical lead contacting the cathode, means to supply a gaseous oxidant to the cathode, an anode, an electrical lead contacting the anode, means to supply a hydrogen containing fuel to the anode, an electrolyte in contact with the cathode and the anode, a gas separator for the cell, the separator comprising a gas inlet portion, a first gas outlet portion, a second gas outlet portion, a member selected from the group consisting of iron and iron alloys positioned between the gas inlet portion and the second gas outlet portion, and means to maintain a hydrogen pressure differential on opposite sides of the member.

This fuel cell can be constructed to operate at various temperatures such as at room temperature, at several hundred degrees centigrade or at high temperatures such as 1000° C. to 1200° C. Such a cell employs a hydrogen containing fuel and generates a gaseous effluent stream. The gas separator of such a cell includes a gas inlet portion, a first gas outlet portion and a second gas outlet portion which are composed of a non-permeable material, such as a non-permeable metal, a ceramic, or a permeable metal with a non-ferrous or ceramic coating to provide a non-permeable material.

We found that the diffusion member in the gas separator should be selected from the group consisting of iron and iron alloys. Such a fuel cell with a gas separator is particularly advantageous to separate hydrogen gas from the effluent stream. The greatest hydrogen gas diffusion at a particular pressure occurs at the iron transformation temperature from the alpha phase to the gamma phase. With an iron diffusion member, this temperature is 915° C. Additionally, an increase in the pressure of the gaseous effluent stream increases the diffusion of hydrogen gas through the metallic diffusion member.

We found that the heated effluent stream from a fuel cell employing an oxygen ion electrolyte and operating in a temperature range of 1000° C. to 1200° C. is at a sufficiently elevated temperature to heat the diffusion member and diffuse the hydrogen gas therethrough. If a room temperature or a lower elevated temperature fuel cell is employed, the effluent stream is not sufficiently hot to produce diffusion of the hydrogen gas through the diffusion member. In this event, we found that the gas inlet portion of the gas separator or the gas separator could be heated by external means to heat the diffusion member to a sufficient temperature to allow diffusion of hydrogen gas therethrough.

In the operation of fuel cell 10 in FIGURE 1, carbonaceous electrode 13 and carbonaceous material supplied through tube 19 provide the carbonaceous fuel. The carbonaceous material is supplied from a hydrocarbon gas or a carbonaceous vapor to electrode 13. Heat, such as waste heat, is supplied from a source (not shown) to raise the temperature of electrodes 13 and 14 of cell 10 in the range of 1000° C. to 1200° C. The molten silver cathode is then saturated with oxygen by bubbling air or oxygen through tube 18 into liquid electrode 14. The reactions at the cathode-electrolyte interface is as follows:

(1)       $O + 2e \rightarrow O^=$

The oxygen ion moves through electrolyte 12 to combine with carbon in accordance with the following reaction at anode-electrolyte interface:

(2)       $C + O^= \rightarrow CO + 2e$

The electrons, which are given up at the anode are conducted through lead 15 to the apparatus (not shown) being operated while the oxygen at the cathode combines with the electrons returning through lead 16.

The carbon monoxide, carbon dioxide and hydrogen comprise a gaseous effluent mixture which is removed by outlet 20. The gaseous mixture flows through gas inlet portion 21 and passage 24 within member 23. The hydrogen component of the gaseous mixture diffuses through metal member 23 into chamber 25. Pump 30 maintains a hydrogen pressure differential on opposite sides of member 23 and removes the hydrogen to a collection vessel. The second gas, which can be a single gas or a gaseous mixture, flows through passage 24 and is discharged through first gas outlet portion 22. If it is desired, this second gas can be collected and stored, or processed further.

In FIGURE 2, a modified high temperature fuel cell is shown which comprises a solid stabilized zirconia electrolyte 31 in the form of a hollow tubular member, a silver electrode 32, which is molten during cell operation, in direct contact with the exterior surface of member 31, and a porous carbonaceous electrode 33 in direct contact with the interior surface of member 31. The electrodes can be reversed with the silver electrode in direct contact with the interior surface of member 31 while the carbonaceous electrode is in direct contact with the exterior surface thereof. A lead 34 is attached to silver electrode 32 while a lead 35 is attached to carbon electrode 33. The free ends of the leads are connected to apparatus (not shown) being operated by the cell.

Means are provided for supplying a gaseous oxidant in the form of air or oxygen to silver electrode 32. For example, a tube 36 connected to an oxidant supply (not shown) supplies oxidant to electrode 32. Carbonaceous fuel is supplied to carbonaceous electrode 33. For example, an inlet line 37 provides a hydrocarbon gas, such as methane or propane to the cell wherein the gas is thermally decomposed to carbonaceous material which is supplied to carbonaceous electrode 33. Thus, electrode 33 and the additional carbonaceous material provide the carbonaceous fuel for the cell.

A gas separator 38, which is connected to the anode chamber, removes the gaseous effluent mixture from the cell. Such a mixture might include, hydrogen, carbon monoxide, and carbon dioxide. Separator 38 includes a gas inlet portion 39 and a first gas outlet portion 40. A second gas outlet portion 41 is positioned partially within outlet 38 and extends outwardly therefrom through its wall. The second gas outlet portion 41 has member 42 across its inlet end. Member 42, which is permeable to hydrogen at elevated temperatures, is located between gas inlet portion 39 and second gas outlet portion 41. A pump 43 is connected to second gas outlet portion 41 to maintain a hydrogen pressure differential on opposite sides of member 42 and to remove the hydrogen gas which diffuses through the member. Such gas is stored in a suitable collection vessel (not shown). A valve 44 is provided in first gas outlet portion 40 to discharge the gaseous mixture or second gas. If it is desired, such gaseous mixture or second gas can be collected and stored, or processed further.

In FIGURE 3 of the drawing, a further modified high temperature fuel cell is shown which comprises a container 11, for example, of alumina or carbon in which is positioned a second container 12 of stabilized zirconia. A silver electrode 14, which is molten during cell operation, is positioned in a second container 12 which is the solid electrolyte in the cell. One end of a lead 16, such as of stainless steel, is inserted in the silver electrode and the other end is connected to apparatus (not shown) being operated by the cell. Lead 16 can be encased by insulation 17. Carbonaceous fuel is supplied to the other surface of the second container 12. For example, an inlet line 45 provides a hydrocarbon gas, such as methane or propane to the cell wherein the gas is thermally decomposed to carbonaceous material which is supplied to the exterior surface of container 12 as at 46 to provide an anode. A carbon lead 15 contacts anode 46 by being positioned adjacent electrolyte 12 and its free end is connected to the same apparatus to complete the circuit from the cell. Thus, the carbonaceous material provides the carbonaceous fuel for the cell. Means are also provided in the form of tube 18 for supplying a gaseous oxidant to silver electrode 14.

A gas separator 47, which is connected to the anode chamber, removes the gaseous effluent mixture from the cell. Separator 47 includes a gas inlet portion 39 and a first gas outlet portion 40. A second gas outlet portion 41 is positioned partially within outlet 47 and extends outwardly therefrom through its wall. Second gas outlet portion 41 has a member 48 across its inlet end. Member 48, which is permeable to hydrogen at elevated temperatures, is located between gas inlet portion 39 and second gas outlet portion 41. Member 48 includes a plate 49 having a plurality of apertures 50 therein and a hollow tube 51 positioned in each of the apertures. The closed end of each tube is directed toward the outlet end of first gas inlet portion 39 while the open end communicates with second gas outlet portion 41. Member 48 provides a greater surface area for the diffusion of hydrogen gas therethrough. A pump 43 is connected to second gas outlet portion 41 to maintain a hydrogen pressure differential on opposite sides of member 42 and to remove the hydrogen gas which diffuses through the member. Such gas is stored in a suitable collection vessel (not shown). A valve 44 is positioned in first gas outlet portion 40 to discharge the gaseous mixture or second gas.

Figure 4:
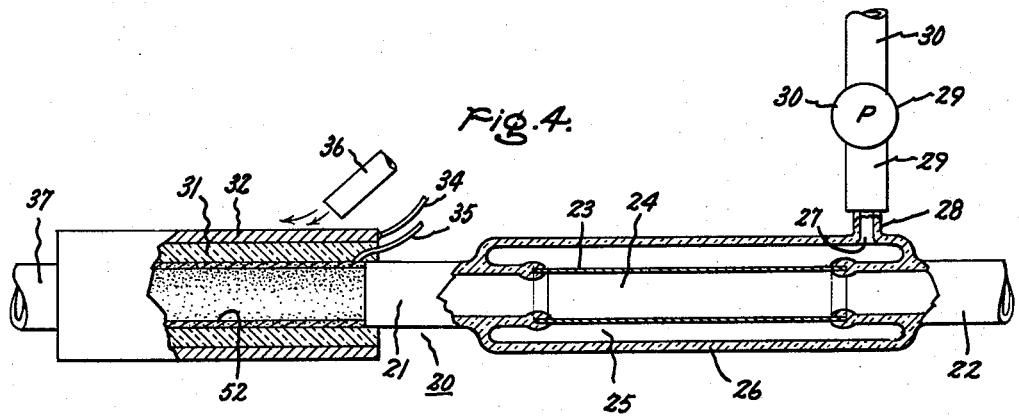
FIGURE 4 is a sectional view of another modified fuel cell with the gas separator of FIGURE 1.

In FIGURE 4 of the drawing, a further modified high temperature fuel cell is shown which comprises a solid stabilized zirconia electrolyte 31 in the form of a hollow tubular member, and a silver electrode 32, which is molten during cell operation, in direct contact with the exterior surface of member 31. Carbonaceous fuel is supplied to the interior surface of member 31. For example, an inlet line 37 provides a hydrocarbon gas, such as methane or propane to the cell wherein the gas is thermally decomposed to carbonaceous material which is supplied to the interior surface of member 31 as at 52 to provide an anode. Thus, the carbonaceous material provides the carbonaceous fuel for the cell. The electrodes can be reversed with the silver electrode in direct contact with the interior surface of member 31 while the carbonaceous anode is in direct contact with the exterior surface thereof. A lead 34 is attached to silver electrode 32 while a lead 35 contacts anode 52 by being positioned adjacent electrolyte 31. The free ends of the leads are connected to apparatus (not shown) being operated by the cell. Means are provided for supplying a gaseous oxidant in the form of air or oxygen to silver electrode 32. For example, a tube 36 connected to an oxidant supply (not shown) supplies oxidant to electrode 32.

A gas separator 20 removes the gaseous effluent mixture from the cell. Such a mixture might include hydrogen, carbon monoxide and carbon dioxide. Separator 20 includes a gas inlet portion 21 and a first gas outlet 22 which are joined together by a metallic member 23 thereby defining a continuous passage 24. A chamber 25 having a wall 26 surrounds member 23 and part of inlet portion 21 and first gas outlet 22 to define a second gas outlet portion.

Gas inlet portion 21, first gas outlet 22 and chamber wall 26 are composed of a non-permeable material, such as a non-permeable metal, a ceramic or a permeable metal with a non-ferrous or ceramic coating to provide a non-permeable material. Member 23 is selected from the group consisting of iron and iron alloys to provide a hydrogen permeable member at elevated temperatures. An aperture 27 is located in wall 26 of chamber 25. A flange 28, which surrounds aperture 27, has a tube 29 connected thereto. The opposite end of tube 29 is connected to a pump 30 to evacuate chamber 25 whereby a hydrogen pressure differential is maintained and hydrogen gas is removed. Such gas is stored in a suitable vessel (not shown).

In the operation of the fuel cell in FIGURE 2, carbonaceous electrode 33 and carbonaceous material supplied through tube 37 provide a carbonaceous fuel. The carbonaceous material is supplied from a hydrocarbon gas or from a carbonaceous vapor to electrode 33. Heat, such as waste heat, is supplied from a source (not shown) to raise the temperature of electrodes 32 and 33 of the cell in the range of 1000° C. to 1200° C. The molten silver cathode 32 is then saturated with oxygen by blowing air or oxygen through tube 36 against electrode 32. Reactions (1) and (2) apply also to the operation of this cell. The electrons, which are given up at anode 33 are conducted through lead 35 to apparatus (not shown) being operated while oxygen at cathode 32 combines with the returning electrons through lead 34.

The carbon monoxide, carbon dioxide and hydrogen comprises a gaseous effluent mixture which is removed by gas separator 38. The gaseous mixture flows through gas inlet portion 39 to metal member 42. The hydrogen component of the gaseous mixture diffuses through member 42 into second gas outlet portion 41. Pump 43 maintains a hydrogen pressure differential on opposite sides of member 42 and removes the hydrogen to a collection vessel. The second gas caused by the separation of the gaseous mixture at member 42 flows through first gas outlet portion 40 and is dispersed through valve 44. In the event that the second gas is collected and contains several components, it can be subjected to other processes for separating these components.

In the operation of the fuel cell shown in FIGURE 3 of the drawing, carbonaceous material supplied through tube 45 provides the carbonaceous fuel. The carbonaceous material is supplied from a hydrocarbon gas, thermally decomposed, and applied to the exterior surface of container 12 to provide an anode. Heat, such as waste heat, is supplied from a source (not shown) to raise the temperature of electrodes 14 and 46 of the cell in the range of 1000° C. to 1200° C. The molten silver cathode is then saturated with oxygen by bubbling air or oxygen through tube 18 into liquid electrolyte 14. Reactions (1) and (2) apply also to the operation of the cell. The electrons, which are given up at anode 46 conducted through lead 15 to apparatus (not shown) being operated while oxygen at cathode 14 combines with the returning electrons through lead 16.

The gaseous effluent mixture of carbon monoxide, carbon dioxide, and hydrogen are removed by gas separator 47. The gaseous mixture flows through gas inlet portion 39 to member 48. The hydrogen component of the gaseous mixture diffuses through each tube 51 of plate 49 into second gas outlet portion 41. Pump 43 maintains a hydrogen pressure differential on opposite sides of member 48 and removes the hydrogen to a collection vessel. The second gas flows through first gas outlet portion 40 and is discharged through valve 44. In the event that the second gas is collected, and contains several components, it can be subjected to other processes for separating these components.

In the operation of the fuel cell in FIGURE 4, carbonaceous material supplied through tube 37 provides a carbonaceous fuel. The carbonaceous material is supplied from a hydrocarbon gas or from a carbonaceous vapor to form an anode 52. Heat, such as waste heat, is supplied from a source (not shown) to raise the temperature of electrodes 32 and 52 of the cell in the range of 1000° C. to 1200° C. The molten silver cathode 32 is then saturated with oxygen by blowing air or oxygen through tube 36 against electrode 32. Reactions (1) and (2) apply also to the operation of this cell. The electrons, which are given up at anode 51 are conducted through lead 35 to apparatus (not shown) being operated while oxygen at cathode 32 combines with the returning electrons through lead 34.

The carbon monoxide, carbon dioxide and hydrogen comprises a gaseous effluent mixture which is removed by gas separator 20. The gaseous mixture flows through gas inlet portion 21 and passage 24 within member 23. The hydrogen component of the gaseous mixture diffuses through metal member 23 into chamber 25. Pump 30 maintains a hydrogen pressure differential on opposite sides of member 23 and removes the hydrogen to a collection vessel. The second gas, which can be a single gas or a gaseous mixture, flows through passage 24 and is discharged through first gas outlet portion 22. If it is desired, this second gas can be collected and stored, or processed further.

Figure 5:
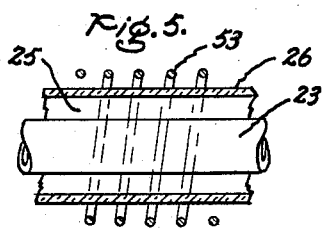
FIGURE 5 is a sectional view of a portion of the gas separator shown in FIGURE 1 with a surrounding heating coil.

In FIGURE 5 of the drawing, a portion of gas separator 20 is shown including diffusion member 23 enclosed by wall 26 of chamber 25. A heating coil 53 is shown surrounding exterior wall 26 to heat diffusion member 23. When a room temperature or moderately elevated temperature fuel cell is employed, it is necessary to heat member 23 to provide for diffusion of hydrogen gas from a gaseous effluent stream through member 23 into chamber 25.

Figure 6:
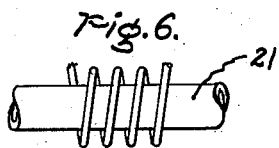
FIGURE 6 is an elevational view of a portion of the gas inlet portion shown in FIGURE 1 with a surrounding heating coil.

In FIGURE 6 of the drawing, a part of gas inlet portion 21 of gas separator 20 is shown. A heating coil 53 surrounds gas inlet portion 21 to heat the gaseous effluent stream from the anode compartment of the fuel cell. The heat from the gaseous stream elevates the temperature of member 23 to provide for hydrogen gas diffusion therethrough.

Several examples of fuel cells which are in accordance with the present invention are as follows:

A fuel cell is provided with a container of alumina into which is positioned a second container of stabilized zirconium. A porous carbonaceous electrode of graphite powder is positioned in the first container and is in direct contact with the second container. A silver electrode, which is molten during cell operation, is positioned within and in direct contact with the second container. A space is provided between the upper surface of the graphite powder electrode and the top of the container. A similar space exists between the upper surface of the silver electrode and the top of the container. A carbon lead contacts the graphite powder electrode while a stainless steel lead contacts a silver electrode. The leads are connected to a load. Oxygen saturation of the silver cathode is achieved by bubbling oxygen through an alumina tube which is inserted into the cathode. An inlet line supplies natural gas to the first container of the cell which gas is thermally decomposed to carbonaceous material and is supplied to the graphite powder electrode.

A gas separator is connected to the anode chamber of the cell to remove the gaseous effluent mixture therefrom which mixture includes hydrogen, carbon monoxide and carbon dioxide. The gas separator includes a gas inlet portion and a first gas outlet portion which are joined together by a metallic member defining a continuous passage. A chamber surrounds the member and part of the gas inlet portion and first gas outlet portion to define a second gas outlet portion. The gas inlet portion, first gas outlet portion and chamber wall are composed of iron to provide a hydrogen permeable member at elevated temperatures. A pump is connected to the chamber to evacuate the chamber maintaining a hydrogen pressure differential and to remove the hydrogen gas.

The cell is heated to a temperature of 1080° C. The load voltage for the cell is 0.62 volt while its current density is 24.0 milliamperes per square centimeter. The gaseous effluent mixture, including hydrogen, carbon monoxide, and carbon dioxide, is removed from the cell through the gas inlet portion of the gas separator. If the gaseous effluent mixture in the gas separator is at a temperature of 690° C. and at a pressure of 44 centimeters of mercury, the hydrogen component of the gaseous mixture diffuses through the iron member of one millimeter thickness at a rate of 0.12 cubic centimeter per minute per square centimeter of iron member surface into the chamber. If the same pressure is maintained, and the outlet temperature of the gaseous mixture is raised to 790° C., 915° C., and 990° C., respectively, the hydrogen component of the mixture will diffuse through the iron member of one millimeter thickness at the rate of 0.42, 1.76, and 0.59 cubic centimeters per minute per cubic centimeter of iron member surface, respectively. The second gaseous mixture flows through the passage and is discharged through the first outlet portion. The hydrogen gas is removed from the chamber by the pump and stored in a suitable vessel.

Another fuel cell is constructed in the same manner as the previous cell. The cell is heated in a resistance furnace to a temperature of 1130° C. The load voltage of the cell is 0.81 volt and its current density is 61.0 milliamperes per square centimeter. If the gaseous effluent mixture in the gas separator is at a temperature of 690° C. and a pressure of 77 centimeters of mercury, the hydrogen component of the gas effluent mixture diffuses through the iron member of one millimeter thickness at a rate of 0.34 cubic centimeter per minute per square centimeter of iron member surface. If the same pressure is maintained and the outlet temperature of the mixture is raised to 790° C., 915° C. and 990° C., respectively, the hydrogen component of the mixture will diffuse through the iron member of one millimeter thickness at the rate of 0.52, 1.12 and 0.88 cubic centimeters per minute per square centimeter of iron member surface, respectively. The hydrogen gas is removed from the chamber by the pump and stored in a suitable vessel. The second gaseous mixture flows through the passage and is discharged through the first gas outlet portion.

Another fuel cell is constructed in the same manner as the first fuel cell and is heated to a temperature of 1020° C. in a resistance furnace. The load voltage of the cell is 0.68 volt and its current density is 3.0 milliamperes per square centimeter. If the gaseous effluent mixture in the gas separator is at a temperature of 690° C. and a pressure of 102 centimeters of mercury, a hydrogen component of the gaseous effluent mixture diffuses through the iron member of one millimeter thickness at a rate of 0.4 cubic centimeter per minute per square centimeter of iron member surface into the chamber. At the same pressure and at temperatures of 790° C., 915° C., and 990° C., respectively, the hydrogen component of the mixture diffuses through the iron member of one millimeter thickness into the chamber at the rate of 0.55, 1.31 and 1.17 cubic centimeters per minute per square centimeter of iron member surface, respectively. The hydrogen gas is removed from the chamber by the pump and stored in a suitable vessel. The second gaseous mixture flows through the passage and is discharged through the first gas outlet portion.

While other modifications of this invention and variations thereof which may be employed within the scope of the invention have not been described, the invention is intended to include such that may be embraced within the following claims.

What we claim as new and desire to secure by Letters Patent of the United States is:

1. A method of recovering hydrogen from a fuel cell which comprises providing a heated gaseous effluent stream containing hydrogen at a temperature in the temperature range of 790° C. to 990° C., contacting said stream with a hydrogen permeable member selected from the group consisting of iron and iron alloys, and diffusing hydrogen from said stream through said member.

2. A method of recovering hydrogen from a fuel cell which comprises providing a heated gaseous effluent stream containing hydrogen at a temperature of 915° C., contacting said stream with a hydrogen permeable member selected from the group consisting of iron and iron alloys, and diffusing hydrogen from said stream through said member.

3. A method of recovering hydrogen from a fuel cell which comprises providing a gaseous effluent stream containing hydrogen, heating the stream to a temperature in the range of 790° C. to 990° C., contacting said stream with a hydrogen permeable member selected from the group consisting of iron and iron alloys, and diffusing hydrogen from said stream through said member.

4. A method of recovering hydrogen from a fuel cell which comprises providing a gaseous effluent stream containing hydrogen, heating said stream to a temperature of 915° C., contacting said stream with a hydrogen permeable member selected frof the group consisting of iron and iron alloys, and diffusing hydrogen from said stream through said member.

5. A method of recovering hydrogen from a fuel cell which comprises providing a gaseous effluent stream containing hydrogen, providing a hydrogen permeable member selected from the group consisting of iron and iron alloys, heating said member to a temperature in the temperature range of 790° C. to 990° C., contacting said stream with said member, and diffusing hydrogen from said stream through said member.

6. A method of recovering hydrogen from a fuel cell which comprises providing a gaseous effluent stream containing hydrogen, providing a hydrogen permeable member selected from the group consisting of iron and iron alloys, heating said member to a temperature of 915° C., contacting said stream with said member, and diffusing hydrogen from said stream through said member.

References Cited by the Examiner

UNITED STATES PATENTS

| | | | |
|---|---|---|---|
| 1,174,631 | 3/16 | Snelling | 23—210 X |
| 1,951,280 | 3/34 | Hale | 23—288 |
| 2,773,561 | 12/56 | Hunter | 55—16 |
| 2,901,524 | 8/59 | Gorin et al. | 136—86 |
| 3,080,442 | 3/63 | Hobert | 136—86 |

OTHER REFERENCES

Metal Handbook, vol. 1, 8th Ed., July 1961, pp. 600–601.

WINSTON A. DOUGLAS, *Primary Examiner.*

JOHN R. SPECK, JOHN H. MACK, *Examiners.*